United States Patent
Pendleton et al.

(10) Patent No.: US 10,960,886 B2
(45) Date of Patent: Mar. 30, 2021

(54) TRAFFIC LIGHT ESTIMATION

(71) Applicant: Motional AD LLC, Boston, MA (US)

(72) Inventors: Scott D. Pendleton, Singapore (SG); Aravindkumar Vijayalingam, Singapore (SG)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 16/776,436

(22) Filed: Jan. 29, 2020

(65) Prior Publication Data

US 2020/0238996 A1 Jul. 30, 2020

Related U.S. Application Data

(60) Provisional application No. 62/798,427, filed on Jan. 29, 2019.

(30) Foreign Application Priority Data

Apr. 8, 2019 (DK) .............................. PA201970221

(51) Int. Cl.
*B60W 40/04* (2006.01)
*B60W 30/18* (2012.01)
(Continued)

(52) U.S. Cl.
CPC ...... *B60W 30/18159* (2020.02); *B60W 40/04* (2013.01); *G05D 1/0223* (2013.01);
(Continued)

(58) Field of Classification Search
CPC .. B60W 30/00; B60W 30/09; B60W 30/1859; B60W 30/08; B60W 2555/60;
(Continued)

(56) References Cited

U.S. PATENT DOCUMENTS 5,945,927 A 8/1999 Nakayama et al.
9,092,695 B1 4/2015 Ogale
(Continued)

FOREIGN PATENT DOCUMENTS

CN 107599965 1/2018
EP 3428026 1/2019
(Continued)

OTHER PUBLICATIONS

PCT International Search Report and Written Opinion in International Application No. PCT/US2020/015674, dated May 18, 2020.
(Continued)

*Primary Examiner* — Hoi C Lau

(74) *Attorney, Agent, or Firm* — Fish & Richardson P.C.

(57) ABSTRACT

Among other things, we describe techniques for traffic light estimation using range sensors. A planning circuit of a vehicle traveling on a first drivable region that forms an intersection with a second drivable region receives information sensed by a range sensor of the vehicle. The information represents a movement state of an object through the intersection. A traffic signal at the intersection controls movement of objects through the intersection. The planning circuit determines a state of the traffic signal at the intersection based, in part, on the received information. A control circuit controls an operation of the vehicle based, in part, on the state of the traffic signal at the intersection.

20 Claims, 14 Drawing Sheets

(51) Int. Cl.
*G05D 1/02* (2020.01)
*G06K 9/00* (2006.01)

(52) U.S. Cl.
CPC ..... *G06K 9/00825* (2013.01); *B60W 2420/52* (2013.01); *B60W 2554/408* (2020.02); *B60W 2555/60* (2020.02)

(58) Field of Classification Search
CPC . B60W 2554/408; G08G 1/012; G08G 1/097; G08G 1/096783; G08G 1/052; G08G 1/081; G08G 21/18; G08G 1/00; G08G 1/0967; G08G 1/0968
See application file for complete search history.

(56) References Cited

U.S. PATENT DOCUMENTS

| | | |
|---|---|---|
| 9,070,305 B1 | 6/2015 | Raman et al. |
| 9,164,511 B1 | 10/2015 | Ferguson et al. |
| 9,261,881 B1 | 2/2016 | Ferguson et al. |
| 9,551,867 B1 | 1/2017 | Grabowski et al. |
| 9,701,239 B2 | 7/2017 | Kentley et al. |
| 9,764,736 B2 | 9/2017 | Prokhorov |
| 9,840,003 B2 | 12/2017 | Szatmary et al. |
| 9,898,668 B2 | 2/2018 | Ren et al. |
| 10,106,156 B1 | 10/2018 | Nave et al. |
| 10,643,084 B2 | 5/2020 | Qin et al. |
| 10,650,256 B2 | 5/2020 | Qin et al. |
| 2003/0112132 A1 | 6/2003 | Trajkovic et al. |
| 2005/0105771 A1 | 5/2005 | Nagai et al. |
| 2006/0034484 A1 | 2/2006 | Bahlmann |
| 2009/0051568 A1* | 2/2009 | Corry ............... G08G 1/081 340/935 |
| 2009/0074249 A1 | 3/2009 | Moed |
| 2009/0092334 A1 | 4/2009 | Shulman et al. |
| 2009/0174573 A1 | 7/2009 | Smith |
| 2009/0254235 A1 | 10/2009 | Kuroda |
| 2010/0104199 A1 | 4/2010 | Zhang et al. |
| 2010/0232709 A1 | 9/2010 | Zhang et al. |
| 2010/0278079 A1 | 11/2010 | Meyer et al. |
| 2011/0224893 A1* | 9/2011 | Scofield ............ G08G 1/052 701/119 |
| 2012/0045119 A1 | 2/2012 | Schamp |
| 2012/0106645 A1 | 5/2012 | Lin et al. |
| 2012/0130629 A1* | 5/2012 | Kim ............... B60W 30/09 701/301 |
| 2012/0189410 A1 | 7/2012 | Toebes et al. |
| 2013/0077830 A1 | 3/2013 | Liu |
| 2013/0211682 A1 | 8/2013 | Joshi et al. |
| 2014/0204209 A1 | 7/2014 | Huth et al. |
| 2014/0277901 A1 | 9/2014 | Ferguson et al. |
| 2014/0343842 A1 | 11/2014 | Ranganathan |
| 2015/0100158 A1 | 4/2015 | Tanigawa et al. |
| 2015/0329107 A1 | 11/2015 | Meyer et al. |
| 2016/0140729 A1 | 5/2016 | Soatto et al. |
| 2016/0148063 A1 | 5/2016 | Hong et al. |
| 2016/0167226 A1 | 6/2016 | Schnittman |
| 2017/0072962 A1* | 3/2017 | Meyer ............... B60W 30/00 |
| 2017/0110010 A1* | 4/2017 | Grabs ............... G08G 1/0129 |
| 2017/0221366 A1 | 8/2017 | An et al. |
| 2017/0227970 A1 | 8/2017 | Taguchi et al. |
| 2017/0262709 A1 | 9/2017 | Wellington et al. |
| 2018/0032082 A1 | 2/2018 | Shalev-Shwartz et al. |
| 2018/0122227 A1* | 5/2018 | Mubarek ............ G08B 21/18 |
| 2018/0144202 A1 | 5/2018 | Moosaei et al. |
| 2018/0173237 A1 | 6/2018 | Reiley et al. |
| 2018/0225965 A1* | 8/2018 | MacNeille ....... G08G 1/096783 |
| 2018/0253968 A1* | 9/2018 | Yalla ................ G08G 1/097 |
| 2018/0299893 A1 | 10/2018 | Qin et al. |
| 2018/0300565 A1 | 10/2018 | Qin et al. |
| 2018/0300566 A1 | 10/2018 | Qin et al. |
| 2018/0300567 A1 | 10/2018 | Qin et al. |
| 2019/0025825 A1 | 1/2019 | Takahama |
| 2019/0050648 A1 | 2/2019 | Stojanovic et al. |
| 2019/0291729 A1* | 9/2019 | Kamiya ............... B60T 7/12 |
| 2020/0026960 A1* | 1/2020 | Park .................. G06K 9/6218 |
| 2020/0098269 A1* | 3/2020 | Wray ................ B60W 30/0953 |
| 2020/0130683 A1* | 4/2020 | Oguri ................ B60W 30/0956 |
| 2020/0139944 A1* | 5/2020 | Kamiya ............... B60T 7/22 |
| 2020/0238996 A1* | 7/2020 | Pendleton .......... G06K 9/00825 |
| 2020/0257911 A1 | 8/2020 | Qin et al. |
| 2020/0262422 A1* | 8/2020 | Kamiya ............... B60W 50/14 |
| 2020/0293064 A1* | 9/2020 | Wu .................. G06K 9/6256 |
| 2020/0334861 A1* | 10/2020 | Jin .................... G06T 7/74 |

FOREIGN PATENT DOCUMENTS

| | | |
|---|---|---|
| WO | WO 2013180787 | 12/2013 |
| WO | WO 2016020718 | 2/2016 |
| WO | WO 2018098161 | 5/2018 |
| WO | WO 2018118112 | 6/2018 |
| WO | WO 2018147873 | 8/2018 |

OTHER PUBLICATIONS

U.S. Appl. No. 15/490,694, filed Apr. 18, 2017, Qin et al.
U.S. Appl. No. 15/490,599, filed Apr. 18, 2017, Qin et al.
U.S. Appl. No. 15/490,616, filed Apr. 18, 2017, Qin et al.
U.S. Appl. No. 16/863,857, filed Apr. 30, 2020, Qin et al.
U.S. Appl. No. 15/490,682, filed Apr. 18, 2017, Qin et al.
De Charette et al., "Real time visual traffic lights recognition based on spot light detection and adaptive traffic lights templates." Intelligent Vehicles Symposium, 2009 IEEE Jun. 3, 2009, pp. 358-363.
DK 2nd Search Report in Danish Patent Appln. PA201970221, dated Jan. 13, 2020, 4 pages.
DK 1rst Search Report in Danish Patent Appln. PA201970221, dated Jun. 29, 2019, 9 pages.
Fairfield et al., "Traffic light mapping and detection." Robotics and Automation (ICRA), 2011 IEEE International Conference on May 9, 2011, pp. 5421-5426.
Florentine et al., "Pedestrian notification methods in autonomous vehicles for multi-class mobility-on-demand service." Proceedings of the Fourth International Conference on Human Agent Interaction, Oct. 4, 2016, pp. 387-392.
Levinson et al., "Traffic light mapping, localization, and state detection for autonomous vehicles." Robotics and Automation (ICRA), 2011 IEEE International Conference on May 9, 2001, pp. 5784-5791.
Pendleton et al., "Autonomous golf cars for public trial of mobility-on-demand service." Intelligent Robots and Systems (IROS), 2015 IEEE/RSJ International Conference on Sep. 28, 2018, pp. 1164-1171.
Standards.sae.org, "Taxonomy and Definitions for Terms Related to Driving Automation Systems for On-Road Motor Vehicles," SAE International, Sep. 2016, retrieved on Apr. 18, 2017, <http://standards.sae.org/j3016_201609/>, 3 pages.
DK 3rd Search Report in Danish Patent Appln. No. PA 201970221, dated Nov. 2, 2020, 4 pages.

* cited by examiner

TRAFFIC LIGHT ESTIMATION

CROSS-REFERENCE TO RELATED APPLICATION

This application claims priority to U.S. Provisional Patent Application No. 62/798,427, filed Jan. 29, 2019, and Danish Patent Application No. PA201970221, filed Apr. 8, 2019, the entire contents of which are incorporated herein by reference.

FIELD OF THE INVENTION

This description relates to traffic light estimation.

BACKGROUND

Travel of vehicles through an intersection formed by two lanes is governed by local traffic rules and enforced, in some instances, by a traffic signal at the intersection. One technique to infer a state of the traffic signal (for example, red light, yellow light, green light) at an intersection is to visually observe the state of lights of the traffic signal. Another technique to infer the state of the traffic signal is based on movement of other objects at the intersection. For example, if a vehicle is moving on a first lane that goes through the intersection while another vehicle is stationary on a second lane that forms the intersection with the first lane, then it can be inferred that the traffic signal permits vehicles on the second lane to travel through the intersection and requires vehicles on the first lane to stop at the intersection.

SUMMARY

Techniques are provided for traffic light estimation using range sensors. Certain embodiments of the techniques can be implemented as a computer-implemented method. A planning circuit of a vehicle traveling on a first drivable region that forms an intersection with a second drivable region receives information sensed by a range sensor of the vehicle. The information represents a movement state of an object through the intersection. A traffic signal at the intersection controls movement of objects through the intersection. The planning circuit determines a state of the traffic signal at the intersection based, in part, on the received information. A control circuit controls an operation of the vehicle based, in part, on the state of the traffic signal at the intersection.

These and other aspects, features, and implementations can be expressed as methods, apparatus, systems, components, program products, means or steps for performing a function, and in other ways.

These and other aspects, features, and implementations will become apparent from the following descriptions, including the claims.

DETAILED DESCRIPTION

Figure 1:
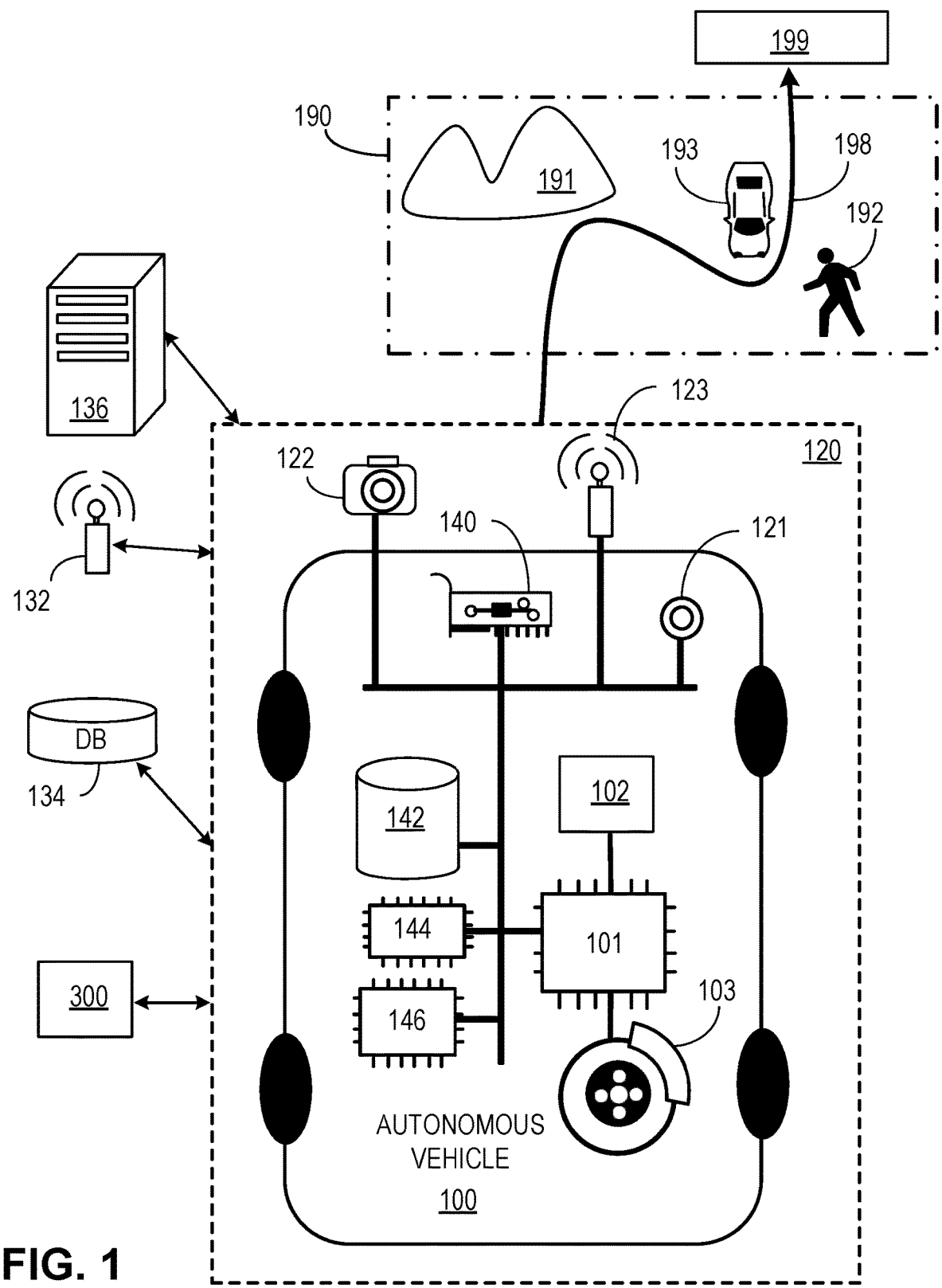
FIG. 1 shows an example of an autonomous vehicle having autonomous capability.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements, or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships, or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. Autonomous Vehicle Architecture
4. Autonomous Vehicle Inputs
5. Autonomous Vehicle Planning
6. Autonomous Vehicle Control
7. Inferring State of A Traffic Light Using Range Sensors General Overview This disclosure describes techniques implemented by an autonomous vehicle to infer a state of a traffic signal at an intersection of two or more lanes using information sensed by range sensors, for example, RADAR- or LiDAR-based sensors. In some embodiments, the information sensed by the RADAR- or LiDAR-based sensors are used to determine a movement state of an object (for example, a vehicle on a lane forming the intersection, a pedestrian at a crosswalk of the intersection, or other object) at the intersection. For example, the object at the intersection can be stationary or moving, for example, at a constant, increasing or decreasing velocity. Based on the movement state of the object, the autonomous vehicle makes inferences about the state of the traffic light, for example, if the traffic signal permits a vehicle at a lane to move through the intersection, a direction in which the vehicle in the lane may move when permitted. In some embodiments, the autonomous vehicle controls operation of the vehicle using the information sensed by the range sensors alone. In some embodiments, the autonomous vehicle augments the information sensed by the range sensors with information sensed by vision-based sensors (for example, one or more cameras) to infer the state of the traffic light and accordingly control the operation of the vehicle. The operations can include, for example, operating the vehicle to remain stationary, to travel on the same lane, to turn from one lane to an intersecting lane, to turn left or right.

System Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings or having two lanes between the lane markings. A lane could also be interpreted in the absence of lane markings. For example, a lane may be defined based on physical features of an environment, e.g., rocks and trees along a thoroughfare in a rural area or, e.g., natural obstructions to be avoided in an undeveloped area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through an obstruction-free portion of a field or empty lot. In another example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

The term "over-the-air (OTA) client" includes any AV, or any electronic device (e.g., computer, controller, IoT device, electronic control unit (ECU)) that is embedded in, coupled to, or in communication with an AV.

The term "over-the-air (OTA) update" means any update, change, deletion or addition to software, firmware, data or configuration settings, or any combination thereof, that is delivered to an OTA client using proprietary and/or standardized wireless communications technology, including but not limited to: cellular mobile communications (e.g., 2G, 3G, 4G, 5G), radio wireless area networks (e.g., Wi-Fi) and/or satellite Internet.

The term "edge node" means one or more edge devices coupled to a network that provide a portal for communication with AVs and can communicate with other edge nodes and a cloud-based computing platform, for scheduling and delivering OTA updates to OTA clients.

The term "edge device" means a device that implements an edge node and provides a physical wireless access point (AP) into enterprise or service provider (e.g., VERIZON, AT&T) core networks. Examples of edge devices include but are not limited to: computers, controllers, transmitters, routers, routing switches, integrated access devices (IADs), multiplexers, metropolitan area network (MAN) and wide area network (WAN) access devices.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Autonomous vehicles have advantages over vehicles that require a human driver. One advantage is safety. For example, in 2016, the United States experienced 6 million automobile accidents, 2.4 million injuries, 40,000 fatalities, and 13 million vehicles in crashes, estimated at a societal cost of $910+ billion. U.S. traffic fatalities per 100 million miles traveled have been reduced from about six to about one from 1965 to 2015, in part due to additional safety measures deployed in vehicles. For example, an additional half second of warning that a crash is about to occur is believed to mitigate 60% of front-to-rear crashes. However, passive safety features (e.g., seat belts, airbags) have likely reached their limit in improving this number. Thus, active safety measures, such as automated control of a vehicle, are the likely next step in improving these statistics. Because human drivers are believed to be responsible for a critical pre-crash event in 95% of crashes, automated driving systems are likely to achieve better safety outcomes, e.g., by reliably recognizing and avoiding critical situations better than humans; making better decisions, obeying traffic laws, and predicting future events better than humans; and reliably controlling a vehicle better than a human.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Figure 2:
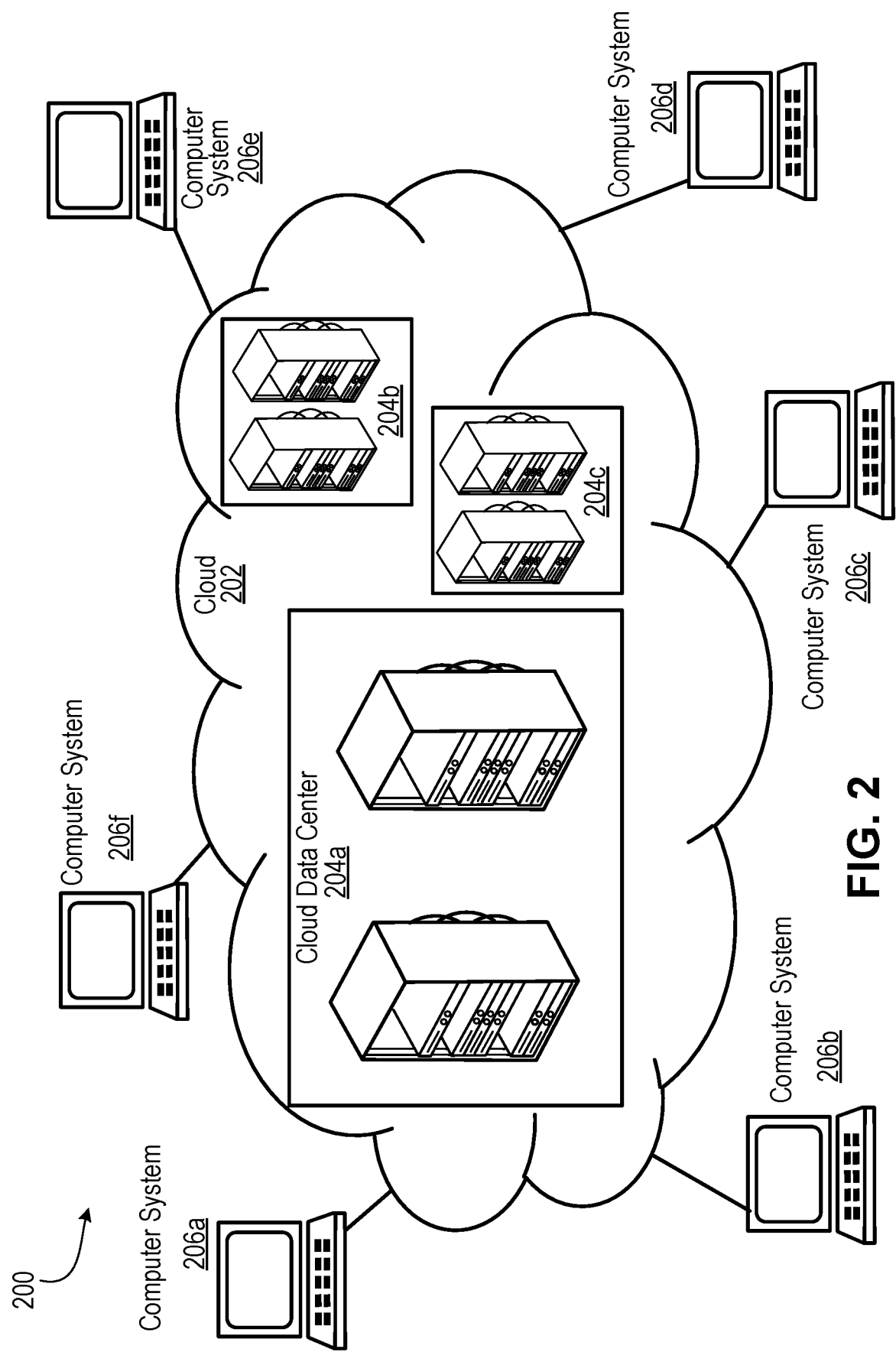
FIG. 2 illustrates an example "cloud" computing environment.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204*a*, 204*b*, and 204*c* and help facilitate the computing systems' 206*a-f* access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206*a-f* or cloud computing services consumers are connected to the cloud 202 through network links and network adapters. In an embodiment, the computing systems 206*a-f* are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206*a-f* are implemented in or as a part of other systems.

Figure 3:
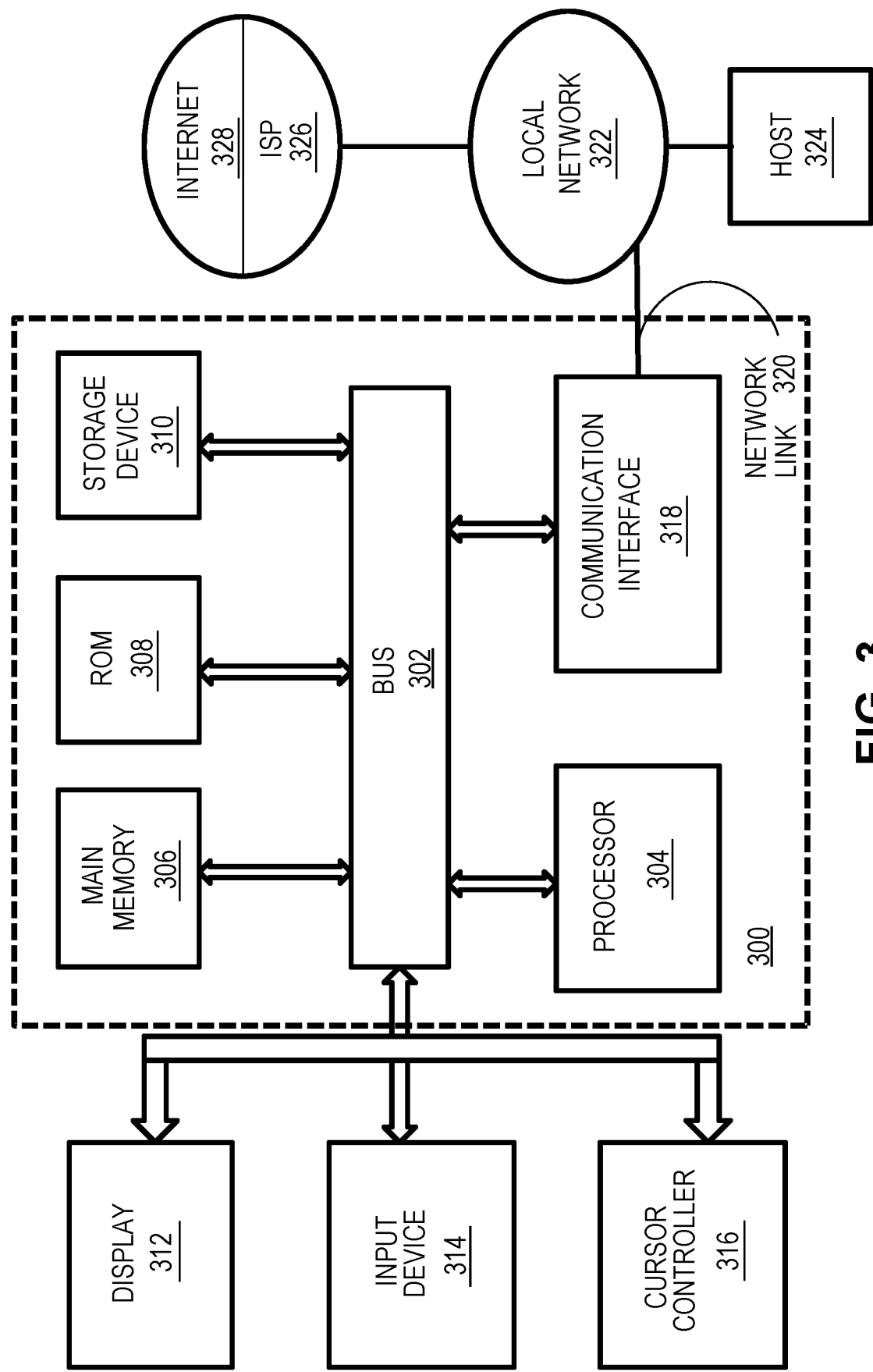
FIG. 3 illustrates a computer system.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic, or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
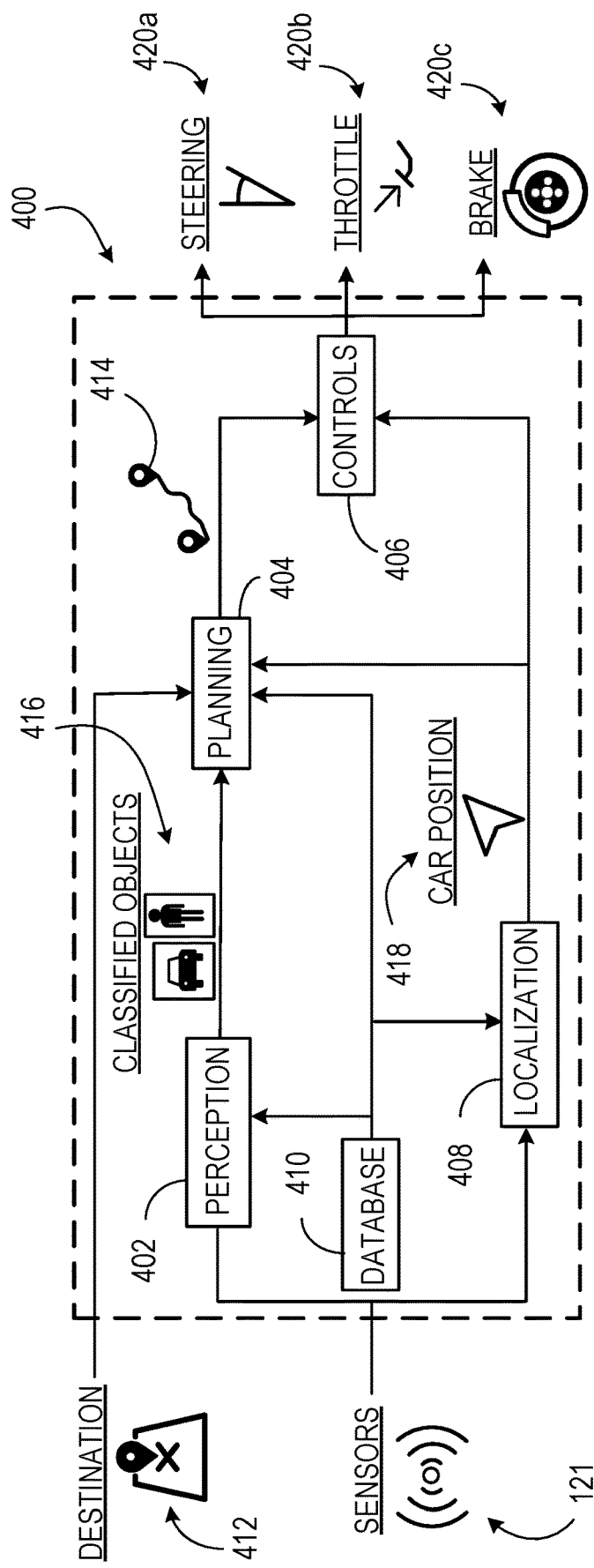
FIG. 4 shows an example architecture for an autonomous vehicle.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things). Each of the modules 402, 404, 406, 408, and 410 is sometimes referred to as a processing circuit (e.g., computer hardware, computer software, or a combination of the two). A combination of any or all of the modules 402, 404, 406, 408, and 410 is also an example of a processing circuit.

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. In an embodiment, the high-precision maps are constructed by adding data through automatic or manual annotation to low-precision maps.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
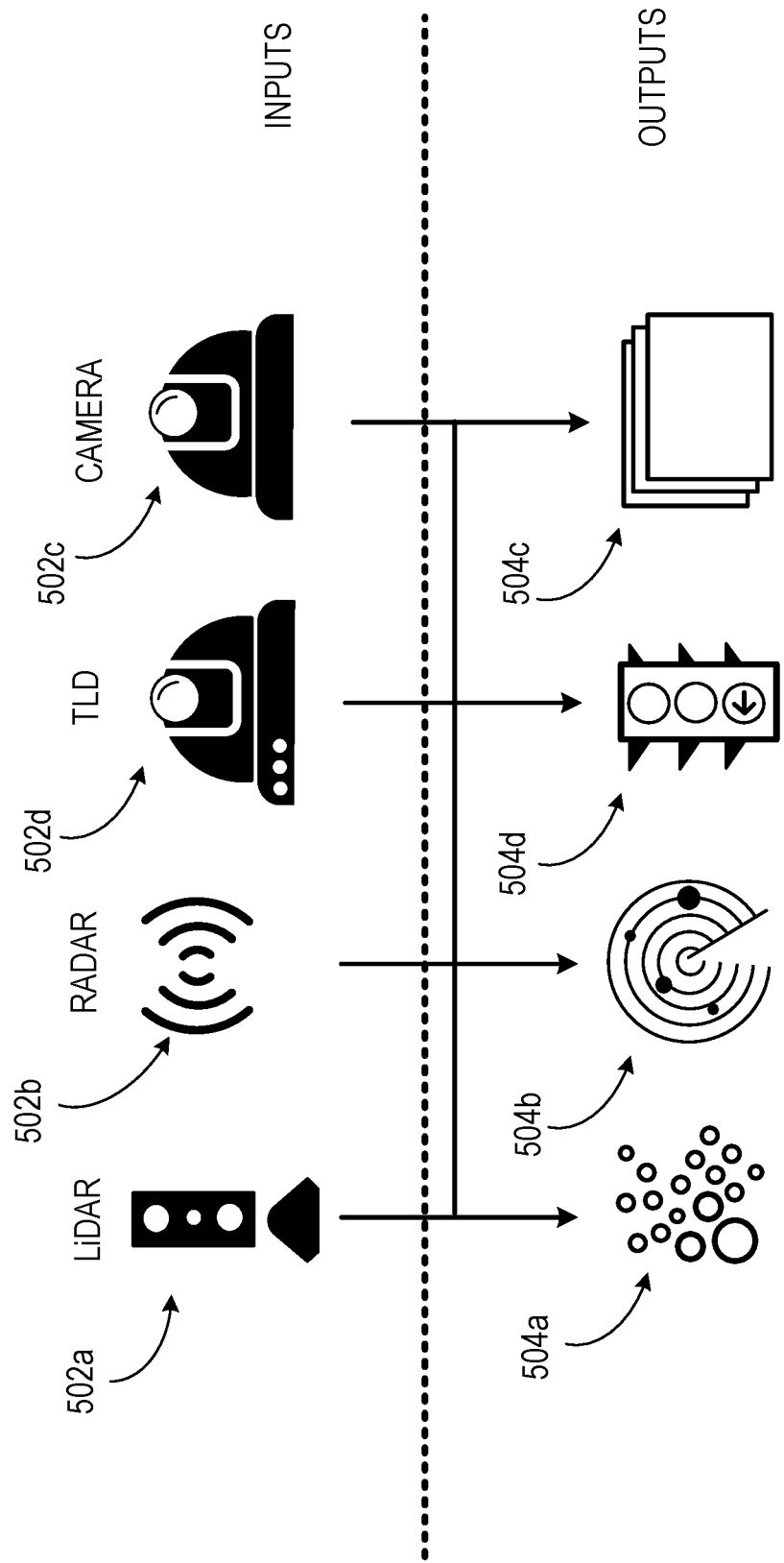
FIG. 5 shows an example of inputs and outputs that may be used by a perception module.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 504a-d are combined using a sensor fusion technique. Thus, either the individual outputs 504a-d are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
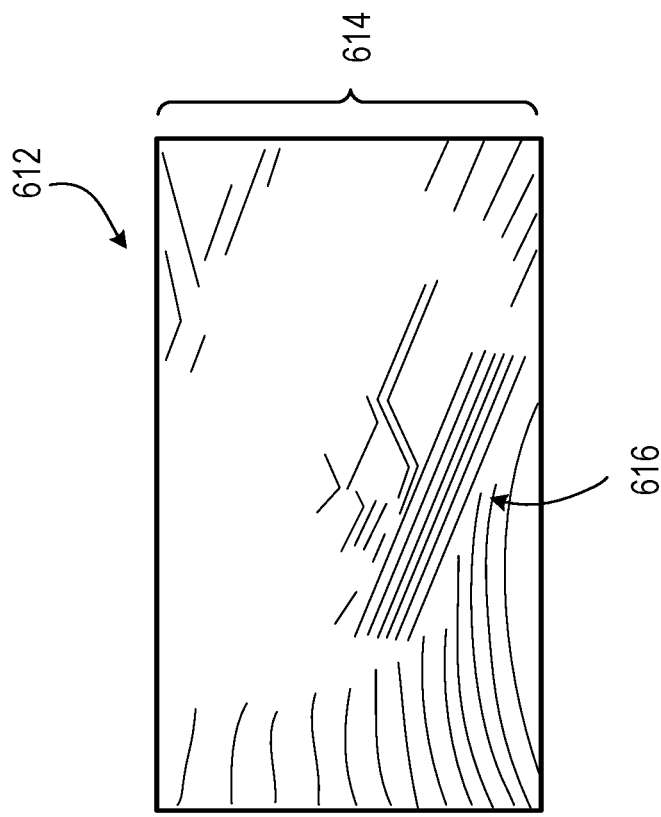
FIG. 6 shows an example of a LiDAR system.
Figure 6:
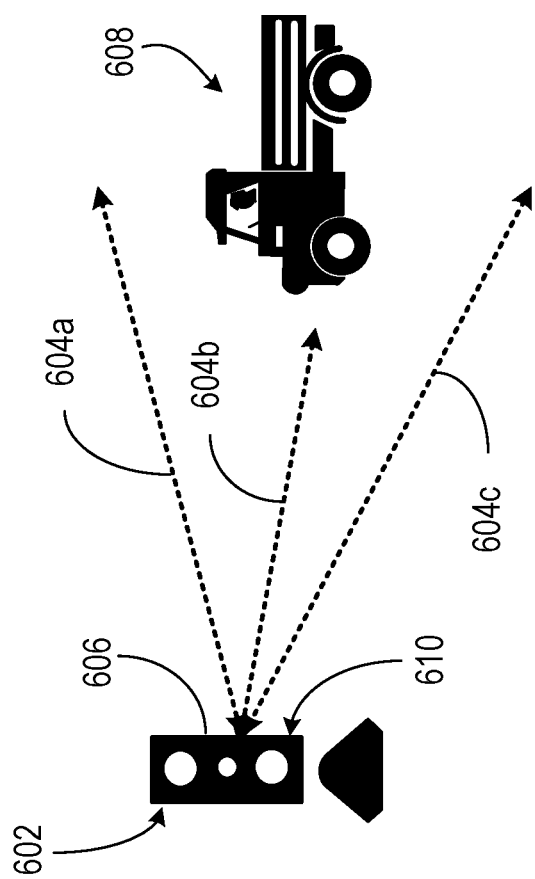

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
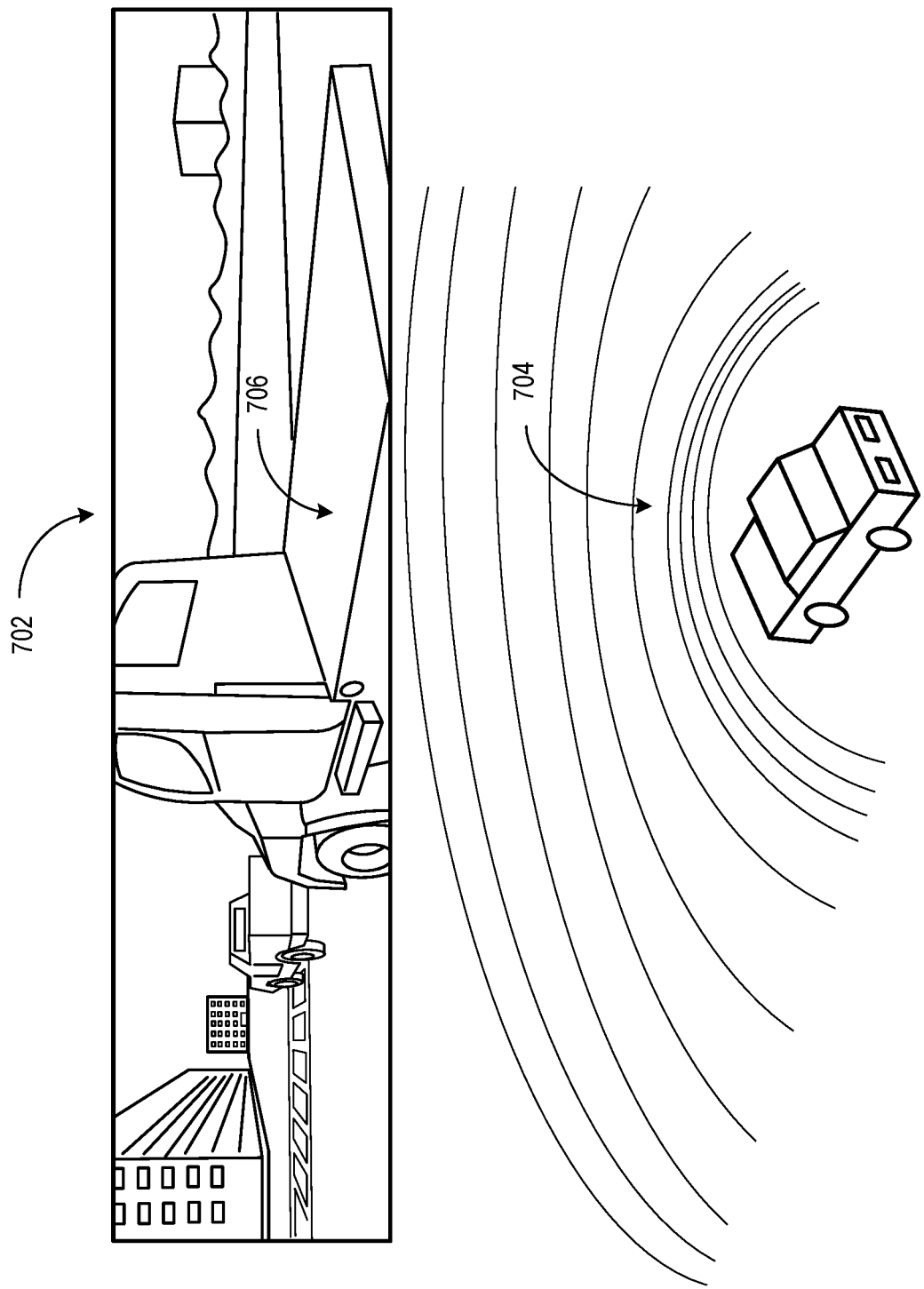
FIG. 7 shows the LiDAR system in operation.

FIG. 7 shows the LiDAR system 602 in operation. In the scenario shown in this figure, the AV 100 receives both camera system output 504c in the form of an image 702 and LiDAR system output 504a in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
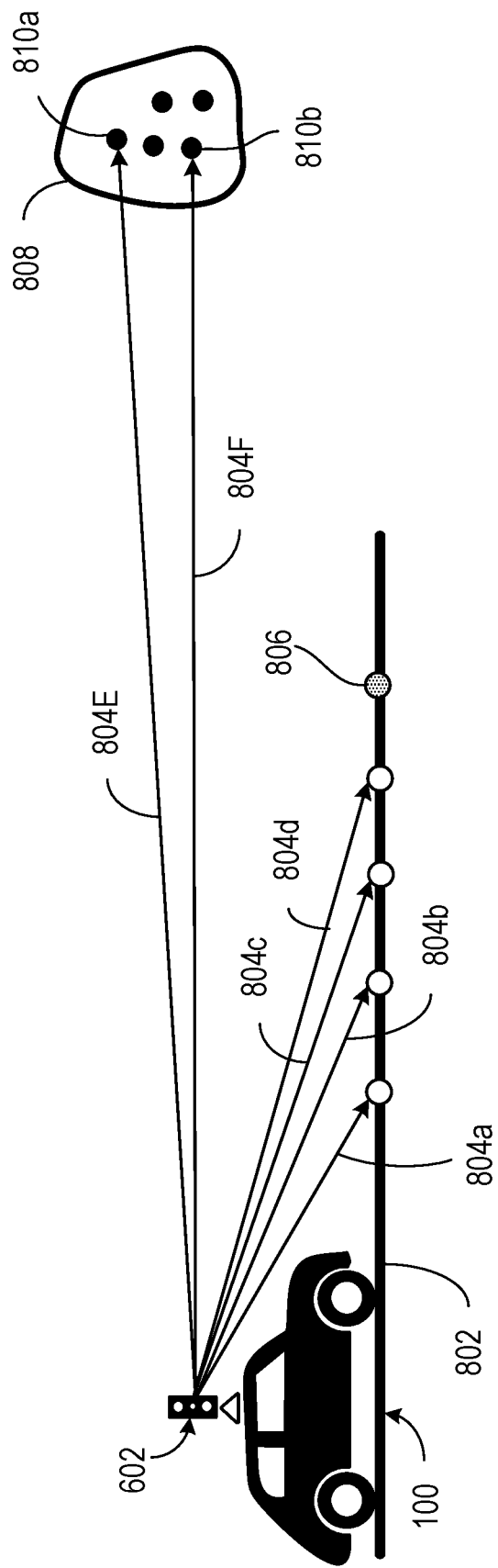
FIG. 8 shows the operation of the LiDAR system in additional detail.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the AV 100 can determine that the object 808 is present.

Path Planning

Figure 9:
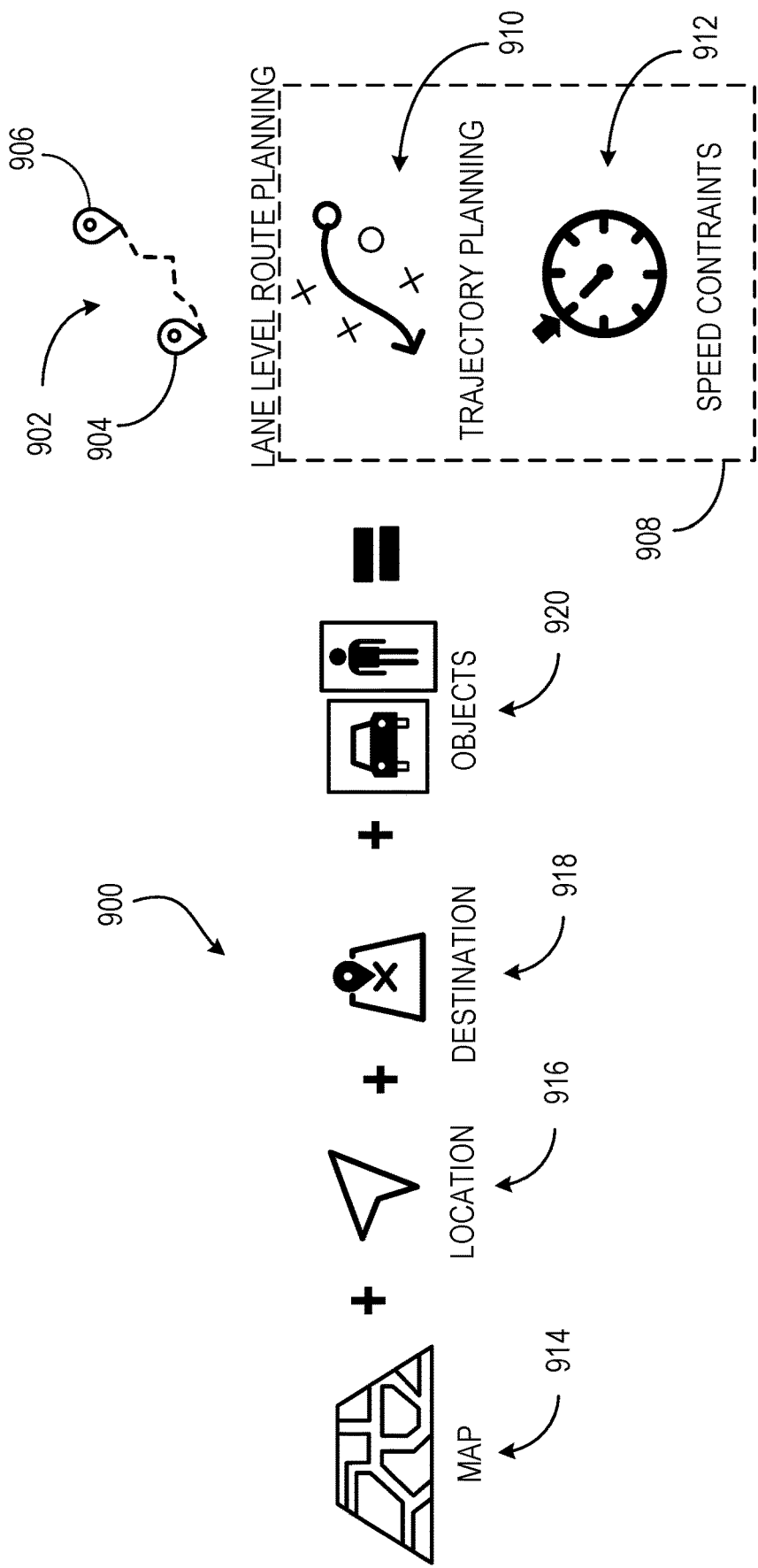
FIG. 9 shows a block diagram of the relationships between inputs and outputs of a planning module.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
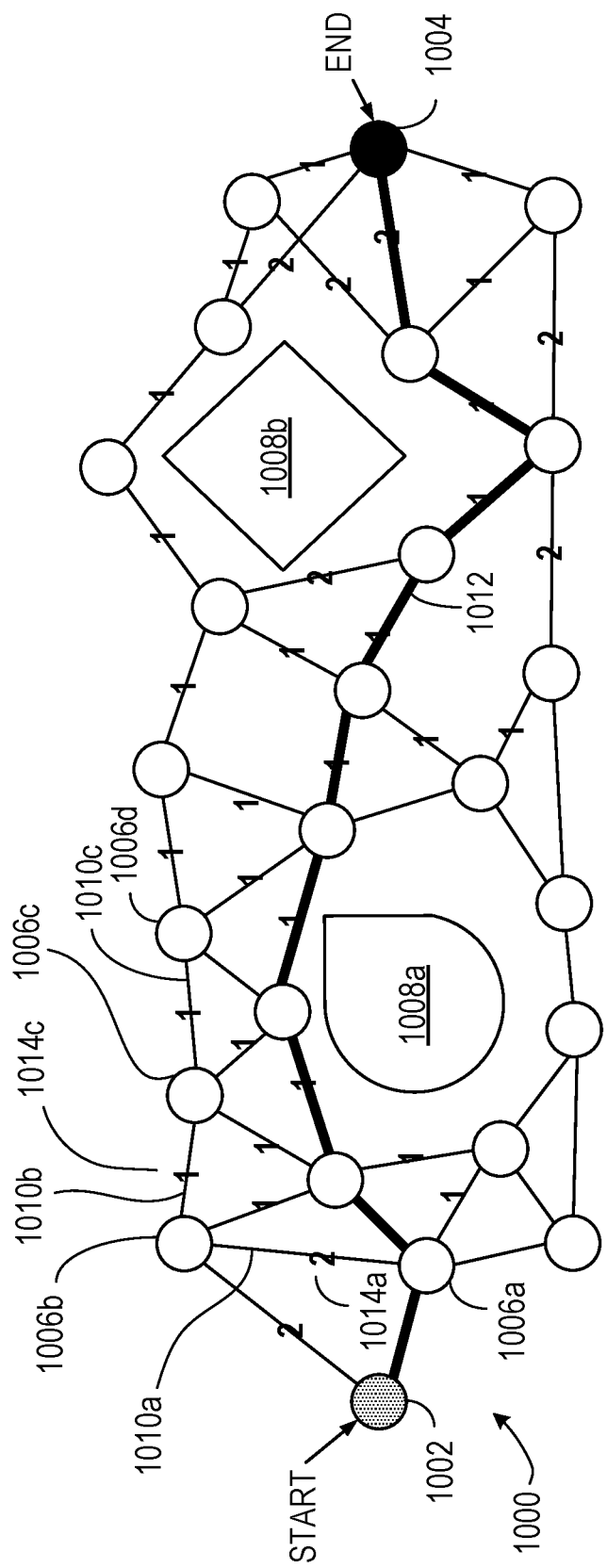
FIG. 10 shows a directed graph used in path planning.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006*a-d* representing different locations between the start point 1002 and the end point 1004 that could be occupied by an AV 100. In some examples, e.g., when the start point 1002 and end point 1004 represent different metropolitan areas, the nodes 1006*a-d* represent segments of roads. In some examples, e.g., when the start point 1002 and the end point 1004 represent different locations on the same road, the nodes 1006*a-d* represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006*a-d* are distinct from objects 1008*a-b* which cannot overlap with a node. In an embodiment, when granularity is low, the objects 1008*a-b* represent regions that cannot be traversed by automobile, e.g., areas that have no streets or roads. When granularity is high, the objects 1008*a-b* represent physical objects in the field of view of the AV 100, e.g., other automobiles, pedestrians, or other entities with which the AV 100 cannot share physical space. In an embodiment, some or all of the objects 1008*a-b* are static objects (e.g., an object that does not change position such as a street lamp or utility pole) or dynamic objects (e.g., an object that is capable of changing position such as a pedestrian or other car).

The nodes 1006*a-d* are connected by edges 1010*a-c*. If two nodes 1006*a-b* are connected by an edge 1010*a*, it is possible for an AV 100 to travel between one node 1006*a* and the other node 1006*b*, e.g., without having to travel to an intermediate node before arriving at the other node 1006*b*. (When we refer to an AV 100 traveling between nodes, we mean that the AV 100 travels between the two physical positions represented by the respective nodes.) The edges 1010*a-c* are often bidirectional, in the sense that an AV 100 travels from a first node to a second node, or from the second node to the first node. In an embodiment, edges 1010*a-c* are unidirectional, in the sense that an AV 100 can travel from a first node to a second node, however the AV 100 cannot travel from the second node to the first node. Edges 1010*a-c* are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010*a-c* has an associated cost 1014*a-b*. The cost 1014*a-b* is a value that represents the resources that will be expended if the AV 100 chooses that edge. A typical resource is time. For example, if one edge 1010*a* represents a physical distance that is twice that as another edge 1010*b*, then the associated cost 1014*a* of the first edge 1010*a* may be twice the associated cost 1014*b* of the second edge 1010*b*. Other factors that affect time include expected traffic, number of intersections, speed limit, etc. Another typical resource is fuel economy. Two edges 1010*a-b* may represent the same physical distance, but one edge 1010*a* may require more fuel than another edge 1010*b*, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
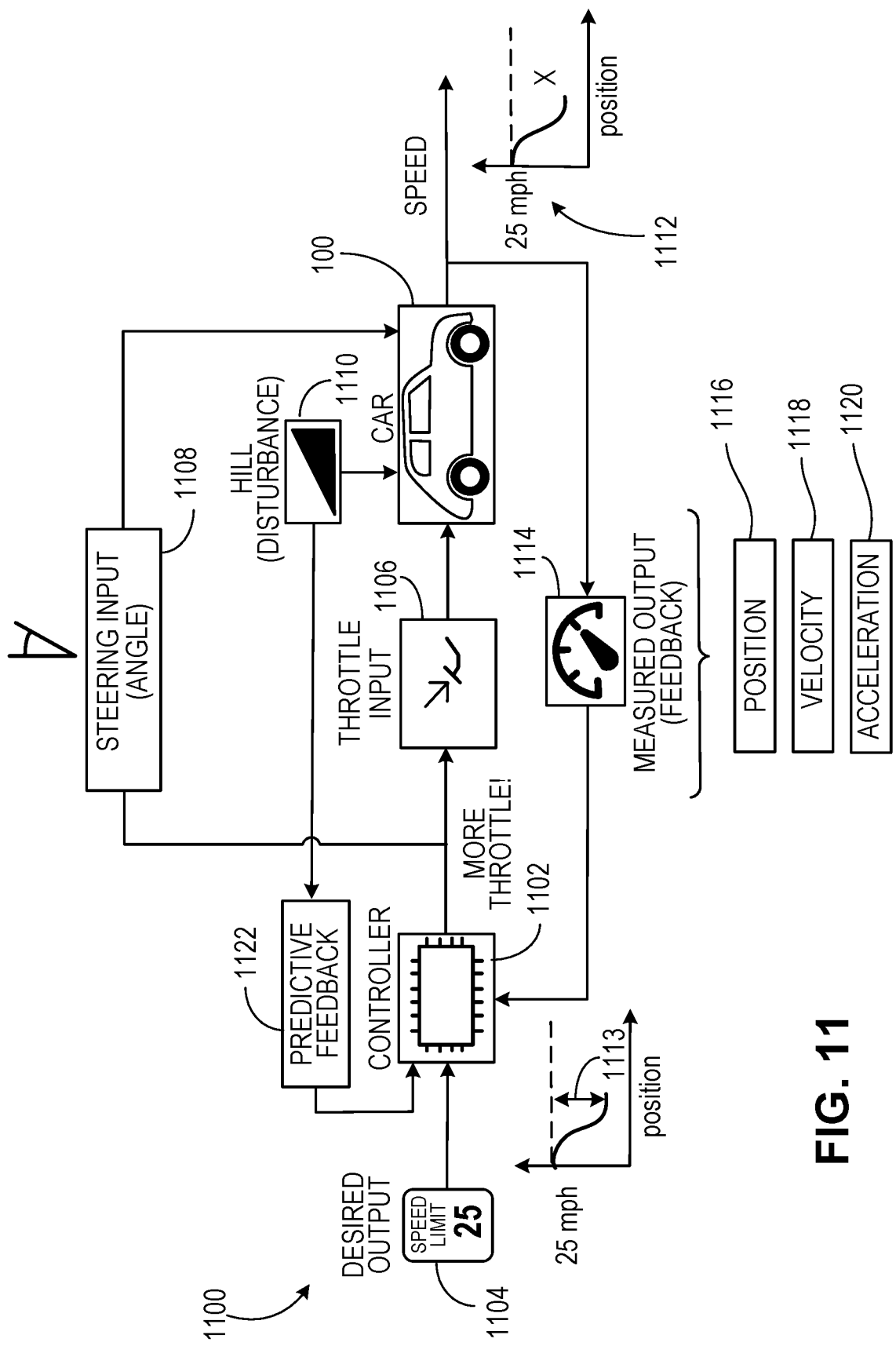
FIG. 11 shows a block diagram of the inputs and outputs of a control module.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 1308, and storage device 210, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
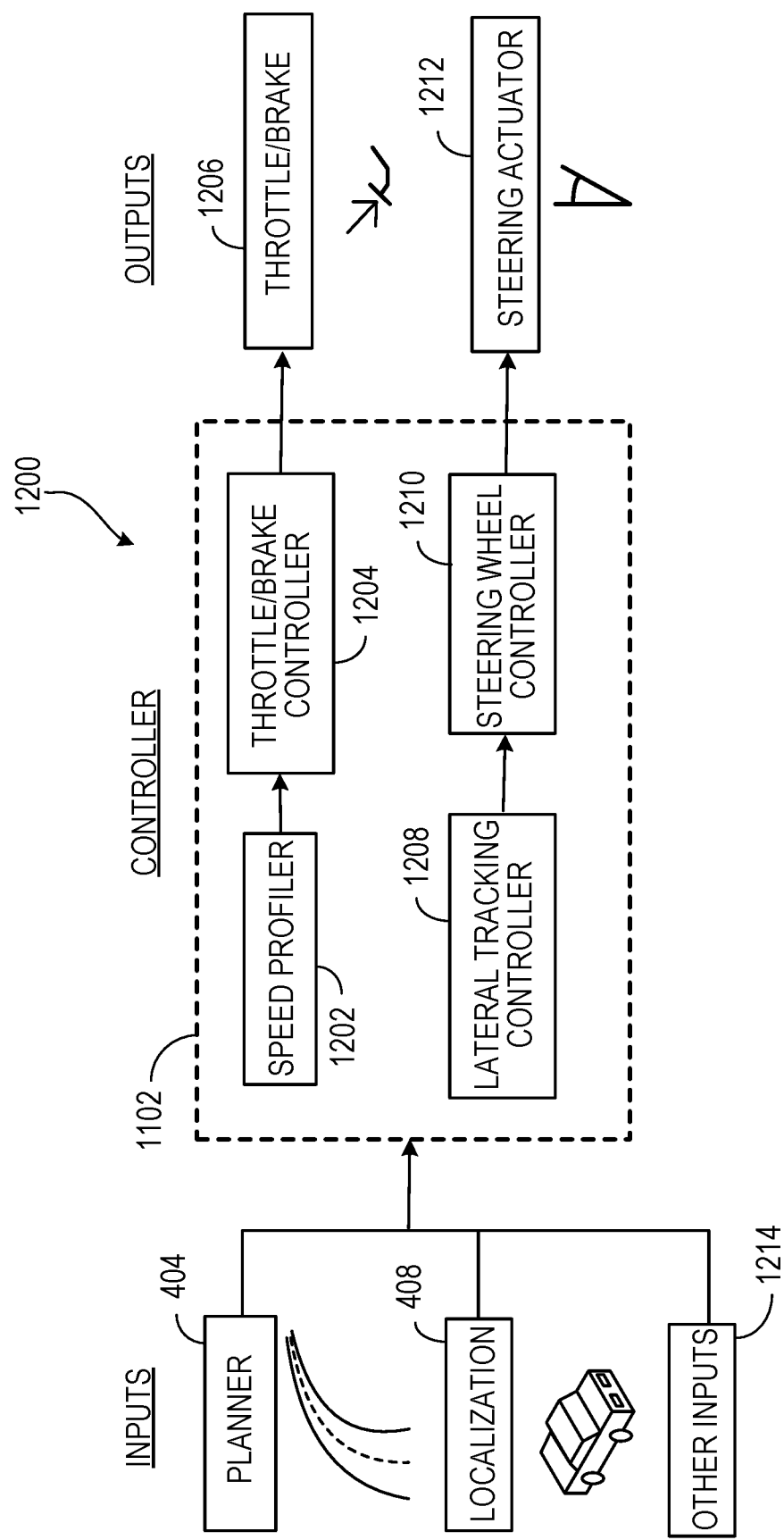
FIG. 12 shows a block diagram of the inputs, outputs, and components of a controller.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1210 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Inferring State of A Traffic Light Using Range Sensors

Figure 13:
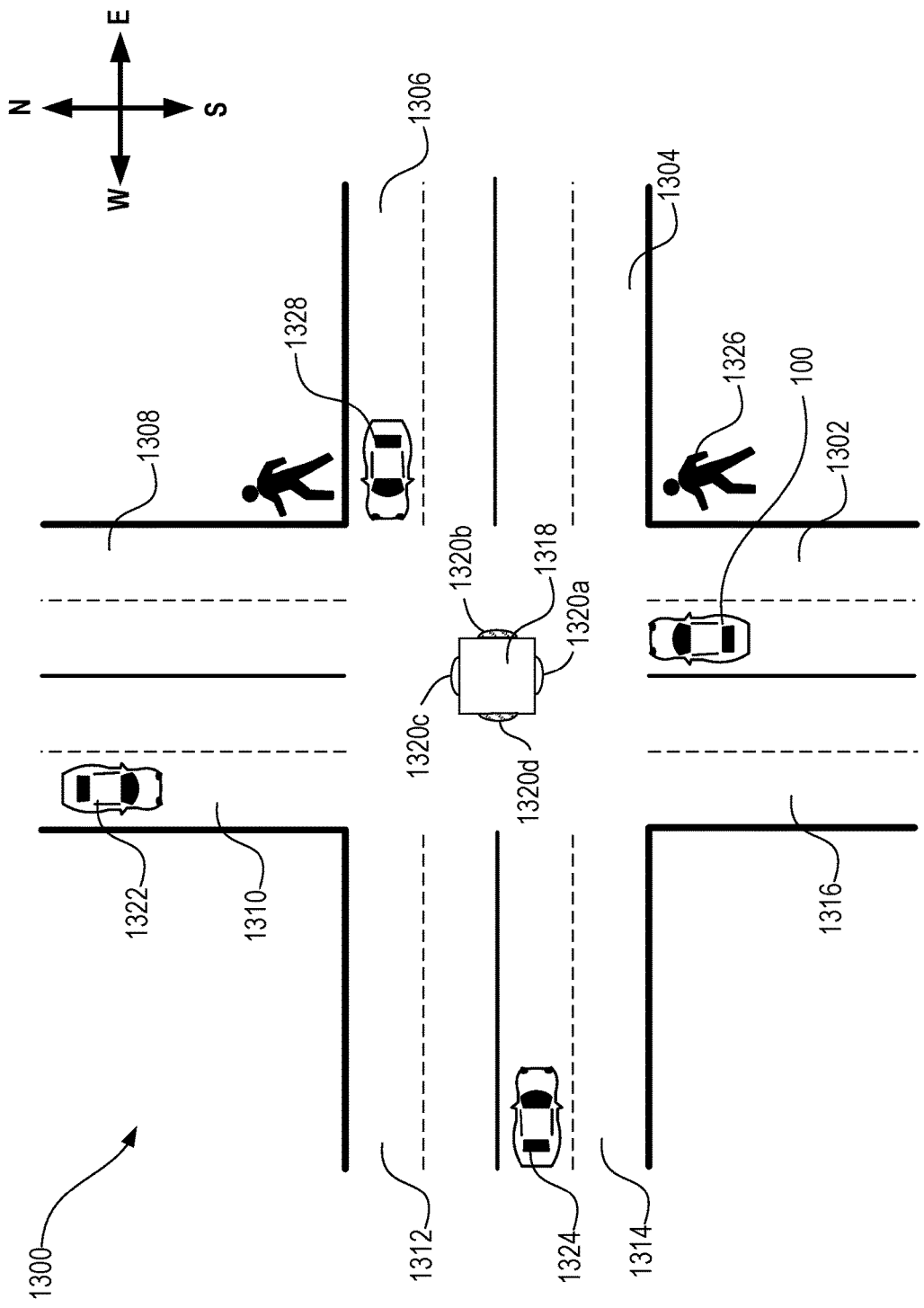
FIG. 13 shows a schematic diagram of an intersection controlled by a traffic signal.

FIG. 13 shows a schematic diagram of an intersection 1300 controlled by a traffic signal 1318. The intersection 1300 is formed by multiple drivable regions. A first drivable region includes road blocks 1302 and 1316 South of the traffic signal 1318. A second drivable region includes road blocks 1304 and 1306 East of the traffic signal 1318. A third drivable region includes road blocks 1308 and 1310 North of the traffic signal 1318. A fourth drivable region includes road blocks 1312 and 1314 West of the traffic signal 1318. In the example intersection 1300, each road block includes two lanes (separated by a dashed line) on which a vehicle can travel. Adjacent road blocks on the same side of the traffic signal 1318 are separated by a lane divider (shown as a solid line) and represent two portions of respective lanes. A vehicle in a road block can travel on any lane in that road block. But, the vehicle in a road block is not legally permitted to cross a lane divider to travel on an adjacent road block.

The traffic signal 1318 controls flow of traffic through the intersection 1300 and includes multiple traffic lights (for example, traffic lights 1320a, 1320b, 1320c, 1320d), each of which visually communicates either permission to travel through or a requirement to stop at the intersection 1300. The traffic signal operates based on local traffic rules. In the example intersection 1300, the local traffic rules require vehicles to travel on the right-hand side of the drivable region, to stop at, slow down while approaching, and go through the intersection 1300 when the traffic signal facing a road block is red, yellow, and green, respectively. Traffic rules at different locations and that govern different intersections can be different. The techniques described in this disclosure can be implemented based on the local traffic rules.

In the example intersection 1300, the AV 100 is shown on the road block 1302 and stopped at the intersection 1300. The local traffic rules that require that, when permitted to travel, the AV 100 turn right from road block 1302 to road block 1304 or travel straight from road block 1302 to 1308 or turn left from road block 1302 to 1312. The local traffic rules additionally permit the AV 100 to travel through the intersection 1300 to road block 1308 or road block 1312 only if the traffic light 1320a facing the road block 1302 is green. At some intersections, the local traffic rules permit the AV 100 to travel from road block 1302 to road block 1304 even if the traffic light 1320a is red as long as no other object is traveling towards road block 1304. The planning module 404 stores these and other local traffic rules and is configured to operate the vehicle in accordance with the stored rules.

The planning module 404 stores traffic light prior map data that includes traffic light information annotated for each intersection in a geographic area. For each traffic light, the stored information includes an association with a "from" road block which is a road block on which the AV 100 can travel toward the traffic signal and a "to" road block which is a road block on which the AV 100 can travel away from the traffic signal. By determining the state of the traffic signal, the planning module 404 can operate the AV 100 to navigate through the intersection 1300 by following the local traffic rules.

In some embodiments, the planning module 404 can determine the state of the traffic signal 1318 by estimating the state of traversal through the intersection 1300. The state of traversal through the intersection 1300 represents a movement state of objects (for example, vehicle 1322 traveling on road block 1310, vehicle 1324 traveling on road block 1314, pedestrian 1326 attempting to cross road blocks 1302 and 1316) at or approaching the intersection 1300. The movement state includes a stationary state in which an object is stationary, that is, not moving, on a road block or through the intersection. The movement state includes a mobile state in which a vehicle is traveling either toward or away from the traffic signal 1318. The mobile state can additionally include a steady velocity state travel in which a velocity of the vehicle is substantially constant or an accelerating state in which a velocity of the vehicle is increasing over time or a decelerating state in which a velocity of the vehicle is decreasing over time. By determining the state of the traffic signal 1318, that is, the movement state of objects in the vicinity of the AV 100, the planning module 404 determines the state of the traffic signal 1318, in some embodiments, without image data generated from the output of the vision-based sensors such as the camera system 502c or the TLD system 102d or both. In some embodiments, the planning module 404 uses the output of the range sensors, for example, the LiDAR system 502a, the RADAR system 502b, auditory sensors like array microphones, or combinations of them to estimate the state of the intersection 1300.

In an embodiment, the state of the traffic signal 1318 is determined by utilizing trained models for the intersection 1300. The trained models are generated by applying machine learning techniques to historical state of traversal data at intersection 1300 or other similar intersections. The trained model takes into account time of day, traffic conditions, pedestrian density based on audiovisual or other data, and weather, among other factors. For example, historical traversal data for the intersection 1300 is gathered and stored. The techniques described here to determine the state of the traffic signal at the intersection 1300 can be applied to the historical traversal data. In some embodiments, the state of the traffic signal is determined at multiple levels of temporal granularity. That is, the state of the traffic signal at each second, each minute, each hour, each day can be determined. Machine learning techniques can be implemented to train the planning module 404 to infer or estimate the state of the traffic signal at the intersection 1300 at a given time instant using the states of the traffic signal determined from the historical traversal data at the multiple levels of temporal granularity. The inferences obtained by machine learning can be improved with the inferences made using information by the range sensors. In addition, the historical traversal data can be updated to improve the machine learning techniques.

Figure 14:
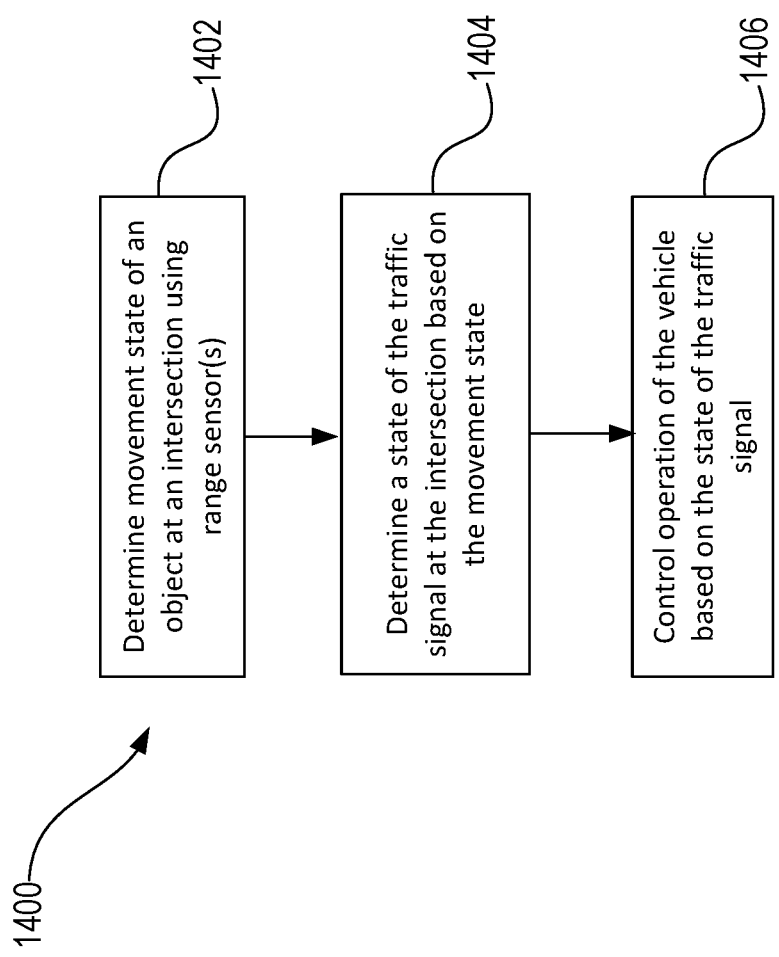
FIG. 14 is a flowchart of an example of a process for operating a vehicle based on estimating state of traversal of an intersection.

FIG. 14 is a flowchart of an example of a process 1400 for operating a vehicle based on estimating state of traversal of an intersection. Certain aspects of the process 1400 are implemented by the planning module 404. Certain aspects of the process 140 can be implemented by the controller 1102. The process 1400 can be implemented to control operation of the vehicle, for example, the AV 100, through an intersection, for example, the intersection 1300. At 1402, the movement state of an object at an intersection is determined using range sensors, for example, LiDAR or RADAR or both. For example, the planning module 402 operates the range sensors (the LiDAR system 502c, the RADAR system 502d or both). Based on the information sensed by the range sensors, the planning module 402 can determine a type of the object, for example, if the object is a vehicle in a drivable region or a pedestrian at a crosswalk. For each object, the planning module 402 determines a movement state at any given time. For example, for a vehicle, the planning module 404 can determine a road block on which the vehicle is traveling, if the vehicle is stationary or mobile, a direction of travel, a velocity, if the vehicle is accelerating or decelerating. For a pedestrian, the planning module 404 can determine if the pedestrian is on a road block or adjacent a road block, if the pedestrian is moving or stationary.

At 1404, a state of the traffic signal at the intersection is determined based on the movement state. At 1406, operation of the vehicle is controlled based on the state of the traffic signal. The operation of the vehicle is based also on a trajectory on which the vehicle needs to travel. Example techniques implemented by the planning module 402 to determine the state of the traffic signal based on the movement state of objects and controlling operation of the vehicle based on the state of the traffic signal are described with reference to the intersection 1300. Certain examples described below assume that the AV 100 and one other object are at the intersection 1300 when the planning module 400 implements the process 1400. In instances in which the AV 100 and more than one object at the intersection 1300, the planning module 402 can combine techniques described below with reference to each object.

In one example, the AV 100 is traveling on the road block 1302 and its trajectory continues through the intersection 1300 to road block 1308. Based on information sensed by the range sensors, the planning module 402 determines that the vehicle 1328 traveling on the road block 1306 is in a stationary state. In this example, the information sensed by the range sensor indicates that no other object is in the vicinity of the AV 100 at the intersection 1300, that is, the vehicle 1328 is the only object at the intersection 1300 other than the AV 100. Because the vehicle 1328 remains in a stationary state at the intersection 1300, the planning module 402 determines, that is, infers or estimates, that the traffic light 1320a is green and the traffic light 1320b is red permitting the AV 100 to travel through and requiring that the vehicle 1328 stop at the intersection 1300. Based on this determination of the state of the traffic signal 1318, the planning module 402 operates the AV 100 to travel through the intersection 1300 to road block 1308.

In another example, the AV 100 is on the road block 1302 in a stationary state at the intersection 1300 and its trajectory continues through the intersection 1300 to road block 1308. Based on information sensed by the range sensors, the planning module 402 determines that the vehicle 1328 traveling on the road block 1306 is in a decelerating state as the vehicle 1328 approaches the intersection 1300. In this example, the information sensed by the range sensor indicates that no other object is in the vicinity of the AV 100 at the intersection 1300, that is, the vehicle 1328 is the only object at the intersection 1300 other than the AV 100. Because the vehicle 1328 is in a decelerating state, the planning module 402 determines, that is, infer or estimate, that the traffic light 1320b is either red or about to turn red, and the traffic light 1320a is green or about to turn green permitting the AV 100 to travel through the intersection 1300. Based on this determination of the state of the traffic signal 1318, the planning module 402 operates the AV 100 to initiate travel through the intersection 1300 to road block 1308.

In a further example, the AV 100 is traveling on the road block 1302 and its trajectory turns right at the intersection 1300 to road block 1304. Based on the information sensed by the range sensors, the planning module 402 determines that a pedestrian 1326 is at the intersection 1300. The planning module 402 also determines that the local traffic rules permit the AV 100 to turn right from the road block 1302 to the road block 1304 even if the traffic light 1320a is red, except when a pedestrian intends to cross from road block 1302 to road block 1316 or from road block 1304 to road block 1306. Based on information sensed by the range sensors, the planning module 402 determines that the pedestrian 1326 is stationary. In this example, the information sensed by the range sensor indicates that no other object is in the vicinity of the AV 100 at the intersection 1300, that is, the pedestrian 1328 is the only object at the intersection 1300 other than the AV 100. Because the pedestrian 1326 remains in a stationary state at the intersection 1300 and because the local traffic rules permit a right turn from the road block 1302 to the road block 1304, the planning module 402 determines, that is, infers or estimates, that the traffic signal 1318 permits the AV 100 to turn right on to the road block 1304. Based on this determination of the state of the traffic signal 1318, the planning module 402 operates the AV 100 to turn right on to the road block 1304.

In some embodiments, the movement state of the object includes a direction of travel of the object. In another example, the AV 100 is on the road block 1302 in a stationary state at the intersection 1300 and its trajectory turns left at the intersection 1300 to road block 1312. Based on information sensed by the range sensors, the planning module 402 determines that the vehicle 1322 is either in a stationary state or a decelerating state on the road block 1310 and that the vehicle 1324 traveling on the road block 1306 is turning right at the intersection 1300 to road block 1316. In this example, the information sensed by the range sensor indicates that no other object is in the vicinity of the AV 100 at the intersection 1300, that is, the vehicles 1322 and 1326 are the only objects at the intersection 1300 other than the AV 100. Because the vehicle 1322 is in the stationary state or in the decelerating state and the vehicle 1326 is turning right, the planning module 402 determines, that is, infers or estimates, that the traffic light 1320a is green permitting a left turn from road block 1302 to road block 1312 and that the traffic light 1320c is red. The planning module 402 can additionally determine that the right turn executed by the vehicle 1324 does not affect the left turn to be executed by the AV 100. Based on this determination of the state of the traffic signal 1318 and the movement state of the vehicle 1324, the planning module 402 operates the AV 100 to initiate the left turn from road block 1302 to road block 1312 through the intersection 1300.

In some embodiments, the planning module 404 determines the state of the traffic signal 1318 using vision-based sensors, for example, the camera system 502c or the TLD system 502d or both. Using the image data generated from the output of the vision-based sensors, the planning module 404 determines the state of the traffic signal 1318. By combining inferences of the state of the traffic signal 1318 determined using the vision-based sensors with that determined using the range sensors, the planning module 402 adjusts an inference about the state of the traffic signal 1318. In this manner, the information sensed by the range sensors is used to augment the information sensed by the vision-based sensors when determining a state of the traffic signal 1318. In instances in which the information from the vision-based sensors contradicts the information from the range sensors, the planning module 402 selects the information from the vision-based sensors. For example, if the vision-based sensors sense that a traffic signal is red whereas the information from the range sensors yields an inference that the traffic signal is green, the planning module 402 determines that the traffic signal is red, thereby overriding the information from the range sensors.

For example, the traffic signal 1320d is red, and the traffic signal 1320a is green. The planning module 402 infers that the state of the traffic signal 1318 requires the vehicle 1324 traveling on road block 1314 to stop at the intersection 1300 and permits the AV 100 to travel through the intersection 1300. In some embodiments, the planning module 402 can infer the state of the traffic signal 1318 based on movement states of other vehicles (not shown) on either road block 1302 or road block 1314 or both. In some embodiments, the planning module 402 infers the state of the traffic signal 1318 based on output of the vision-based sensors. As the planning module 402 initiates or continues travel of the AV 100 through the intersection 1300, the planning module 402 determines, based on the information sensed by the range sensors, that the vehicle 1324 is not likely to stop at the intersection 1300. For example, the planning module 402 determines a safety threshold representing a likelihood that the vehicle 1324 will stop at the intersection 1300. The safety threshold can be based on factors that include one or more of a speed of the vehicle 1324, a direction of travel of the vehicle 1324, a distance between the vehicle 1324 and the intersection 1300, a distance between the AV 100 and the intersection 1300, or a distance between the AV 100 and the vehicle 1324.

In accordance with the determination that a likelihood of the vehicle 1324 stopping at the intersection is less than the safety threshold, the planning module 402 controls the operation of the AV 100 to avoid a collision with the vehicle 1324. In some embodiments, the planning module 402 can additionally classify the vehicle 1324 as an emergency vehicle (for example, a police vehicle, an ambulance, a fire truck) that is permitted to travel past a red light. In such instances, the planning module 402 controls the AV 100 to stop to give right-of-way to the vehicle 1324. In other words, the planning module 402 initially inferred that the state of the traffic signal 1318 required the vehicle 1324 to stop at the intersection 1300. The planning module 402 also determined that the vehicle 1324 is unlikely to stop at the intersection 1300. In response, the planning module 402 can either accelerate, decelerate or stop the AV 100 to avoid a collision with the vehicle 1324.

In some embodiments, the vision-based sensors sense the information about the state of the traffic signal across multiple frames. Each frame is associated with a time instant and, at each frame, a vision-based sensor captures a respective estimate of the state of the traffic signal. The planning module 402 temporally fuses each respective estimate captured in each frame with the information sensed by the range sensors when inferring the state of the traffic signal 1318.

In some instances, the planning module 402 determines that the AV 100 has a green light based on movement patterns of other vehicles in the same road block as the AV 100. For example, if all vehicles in the same road block as the AV 100 are approaching the intersection 1300 at substantially the same steady velocity state, then the planning module 402 infers that the AV 100 has a green light to drive through the intersection 1300. If all vehicles in the same road block are either in a stationary state or in a decelerating state, then the planning module 402 infers that the AV 100 has a red light. If vehicles in front of and behind the AV 100 have a certain movement state while vehicles in adjacent lanes have a different movement state, then the planning module 402 infers that some vehicles in the road block are permitted to drive through the intersection 1300 while others are required to stop at the intersection 1300. Such a scenario can occur when, for example, when a "left turn only" sign is green while the rest of the lights are red or vice versa.

In some embodiments, the planning module 402 augments the information sensed by the range sensors with information received from other sources. For example, if information about the timing cycles of the lights at the traffic signal 1318 is available, then the planning module 402 can infer the state of the traffic signal 1318 using the information about the timing cycle. For example, if speed profiles of vehicles in the same road block as the AV 100 is available, then the planning module 402 can infer the state of the traffic signal 1318 using the speed profiles. Also, if the traffic signal 1318 is non-operational and traffic through the intersection 1300 is being controlled by a different entity (such as a police officer), then the planning module 402 can control travel of the AV 100 through the intersection 1300 based on the speed profiles of vehicles in the same or different road blocks as the AV 100. Using the information from these other sources, in some implementations, the planning module 402 can determine additional information about the driving conditions of the AV 100, for example, traffic delays, alternative trajectories, to name a few.

In some implementations, the planning module automatically annotates precedence areas using the inference of the state of the traffic signal 1318. A precedence area is a geographically bounded region of interest which is used to filter out, from the set of all detected vehicles, which ones the AV 100 needs to consider for potential intersection traversal conflicts (for example, checking time to collision at one or more locations along the path of the AV 100 through the intersection). Precedence areas would be associated to stop lines and their constraining lanes, and formed by taking lane boundaries of all intersecting lanes in the intersection traced back until a stopping distance threshold for a vehicle travelling at the maximum expected speed for the road, after accounting for factors such as speed limit, road curvature, presence of other stop lines along the route, etc.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A computer-implemented method comprising:
    receiving, by a planning circuit of a vehicle traveling on a first drivable region that forms an intersection with a second drivable region, first information sensed by a range sensor of the vehicle and second information sensed by a vision sensor of the vehicle, each of the first information and the second information representing a movement state of an object through the intersection, wherein the movement state of the object comprises a stationary state in which the object is stationary or a mobile state in which the object is in motion and a direction in which the object is moving, and wherein a traffic signal at the intersection controls movement of objects through the intersection;
    determining, by the planning circuit, a state of the traffic signal at the intersection based, in part, on the received first and second information, wherein the vision sensor is configured to sense the second information across a plurality of frames, each frame capturing a respective estimate of the state of the traffic signal, and wherein determining the state of the traffic signal at the intersection comprises temporally fusing each respective estimate captured in each frame of the plurality of frames with the first information sensed by the range sensor; and
    controlling, by a control circuit, an operation of the vehicle based, in part, on the state of the traffic signal at the intersection.

2. The method of claim 1, further comprising:
    determining, by the planning circuit, the movement state of the object using the information sensed by the range sensor.

3. The method of claim 1, wherein the vehicle is a first vehicle, wherein the object is a second vehicle traveling on the second drivable region, wherein the mobile state comprises a decelerating state in which the mobile second vehicle decelerates as the second vehicle approaches the intersection.

4. The method of claim 1, wherein the vehicle is a first vehicle, wherein the object is a second vehicle traveling on the second drivable region, wherein the mobile state comprises a steady velocity state in which a velocity of the mobile second vehicle remains substantially constant as the second vehicle approaches the intersection.

5. The method of claim 1, wherein the vehicle is a first vehicle, wherein the object is a second vehicle traveling on the second drivable region, wherein the mobile state comprises an accelerating state in which the mobile second vehicle accelerates as the second vehicle approaches the intersection.

6. The method of claim 5, wherein the state of the traffic signal is determined to require the second vehicle to stop at the intersection and to permit the first vehicle to travel through the intersection, wherein the first vehicle is operated to travel through the intersection, wherein the method further comprises:
    determining that a likelihood of the second vehicle stopping at the intersection is less than a safety threshold; and
    in accordance with a determination that the likelihood is less than the safety threshold, controlling the operation of the first vehicle to travel through the intersection before or after the second vehicle travels through the intersection.

7. The method of claim 6, the likelihood of the second vehicle stopping at the intersection being less than the safety threshold is determined based on factors including at least one of a speed of the second vehicle, a direction of travel of the second vehicle, a distance between the second vehicle and the intersection, a distance between the first vehicle and the intersection, or a distance between the first vehicle and the second vehicle.

8. The method of claim 1, wherein the object is a vehicle traveling on the second drivable region, wherein the direction of travel comprises at least one of straight travel on the second drivable region, right turn from the second drivable region to the first drivable region or left turn from the second drivable region to the first drivable region.

9. The method of claim 1, wherein the object is a pedestrian, wherein the movement state is the mobile state comprising a direction in which the object is moving, and wherein the direction of travel comprises across the first drivable region.

10. The method of claim 1, wherein the range sensor comprises a LiDAR-based sensor.

11. The method of claim 1, wherein the range sensor comprises a RADAR-based sensor.

12. The method of claim 1, further comprising determining, based on the received information, that the vehicle traveling on the first drivable region is in a stationary state and at the intersection,
    wherein determining the state of the traffic signal comprises determining that the state of the traffic signal permits the vehicle to travel through the intersection, and
    wherein controlling the operation of the vehicle comprises operating the vehicle to travel through the intersection.

13. The method of claim 1, further comprising determining, based on the received information, that the vehicle traveling on the first drivable region is in a mobile state and approaching the intersection,
wherein determining the state of the traffic signal comprises determining that the vehicle is required to stop at the intersection,
wherein controlling the operation of the vehicle comprises operating the vehicle to decelerate and stop at the intersection.

14. The method of claim 1, wherein the intersection is formed by more than two drivable regions, wherein a movement state of an object on each of the more than two drivable regions is received from the range sensors,
wherein determining the state of the traffic signal at the intersection comprises determining the state of the traffic signal based, in part, on the movement state of the object on each of the more than two drivable regions.

15. The method of claim 1, wherein determining the state of the traffic signal comprises determining that the traffic signal is non-operational, wherein controlling the operation of the vehicle comprises controlling the operation of the vehicle to travel through the intersection based on the movement state of the object.

16. The method of claim 15, wherein the vehicle is a first vehicle, wherein the object is a second vehicle traveling on the first drivable region, wherein controlling the operation of the vehicle to travel through the intersection based on the movement state of the object comprises determining, based on information received from the range sensors, that the second vehicle is moving through the intersection,
wherein controlling the operation of the first vehicle comprises operating the first vehicle to move through the intersection in response to determining that the second vehicle is moving through the intersection.

17. The method of claim 1, wherein the object is a first object, wherein the information comprises movement states of a plurality of objects including the first object through the intersection, wherein a second object of the plurality of objects is traveling on the first drivable region and a third object of the plurality of objects is traveling on the second drivable region, wherein the method further comprises:
determining, by the planning circuit, a traffic delay through the intersection based on the movement states of the plurality of objects.

18. The method of claim 17, further comprising:
determining a speed profile for a second vehicle traveling on either the first drivable region or the second drivable region; and
determining the traffic delay based on the speed profile for the second vehicle.

19. A vehicle comprising:
a planning circuit;
memory; and
at least one program stored in the memory, the at least one program including instructions executable by the planning circuit to perform operations comprising:
receiving, by the planning circuit of the vehicle traveling on a first drivable region that forms an intersection with a second drivable region, first information sensed by a range sensor of the vehicle and second information sensed by a vision sensor of the vehicle, each of the first information and the second information representing a movement state of an object through the intersection, wherein the movement state of the object comprises a stationary state in which the object is stationary or a mobile state in which the object is in motion and a direction in which the object is moving, and wherein a traffic signal at the intersection controls movement of objects through the intersection;
determining, by the planning circuit, a state of the traffic signal at the intersection based, in part, on the received first and second information, wherein the vision sensor is configured to sense the second information across a plurality of frames, each frame capturing a respective estimate of the state of the traffic signal, and wherein determining the state of the traffic signal at the intersection comprises temporally fusing each respective estimate captured in each frame of the plurality of frames with the first information sensed by the range sensor; and
controlling, by a control circuit, an operation of the vehicle based, in part, on the state of the traffic signal at the intersection.

20. A computer-readable storage medium comprising at least one program for execution by a planning circuit of a vehicle, the at least one program including instructions which, when executed by the planning circuit, cause the vehicle to perform operations comprising:
receiving, by a planning circuit of a vehicle traveling on a first drivable region that forms an intersection with a second drivable region, first information sensed by a range sensor of the vehicle and second information sensed by a vision sensor of the vehicle, each of the first information and the second information representing a movement state of an object through the intersection, wherein the movement state of the object comprises a stationary state in which the object is stationary or a mobile state in which the object is in motion and a direction in which the object is moving, and wherein a traffic signal at the intersection controls movement of objects through the intersection;
determining, by the planning circuit, a state of the traffic signal at the intersection based, in part, on the received first and second information, wherein the vision sensor is configured to sense the second information across a plurality of frames, each frame capturing a respective estimate of the state of the traffic signal, and wherein determining the state of the traffic signal at the intersection comprises temporally fusing each respective estimate captured in each frame of the plurality of frames with the first information sensed by the range sensor; and
controlling, by a control circuit, an operation of the vehicle based, in part, on the state of the traffic signal at the intersection.

* * * * *